Jan. 24, 1967   N. E. HOPKINS ETAL   3,299,666
PURGE SYSTEM FOR ABSORPTION REFRIGERATION APPARATUS
Filed Sept. 30, 1965
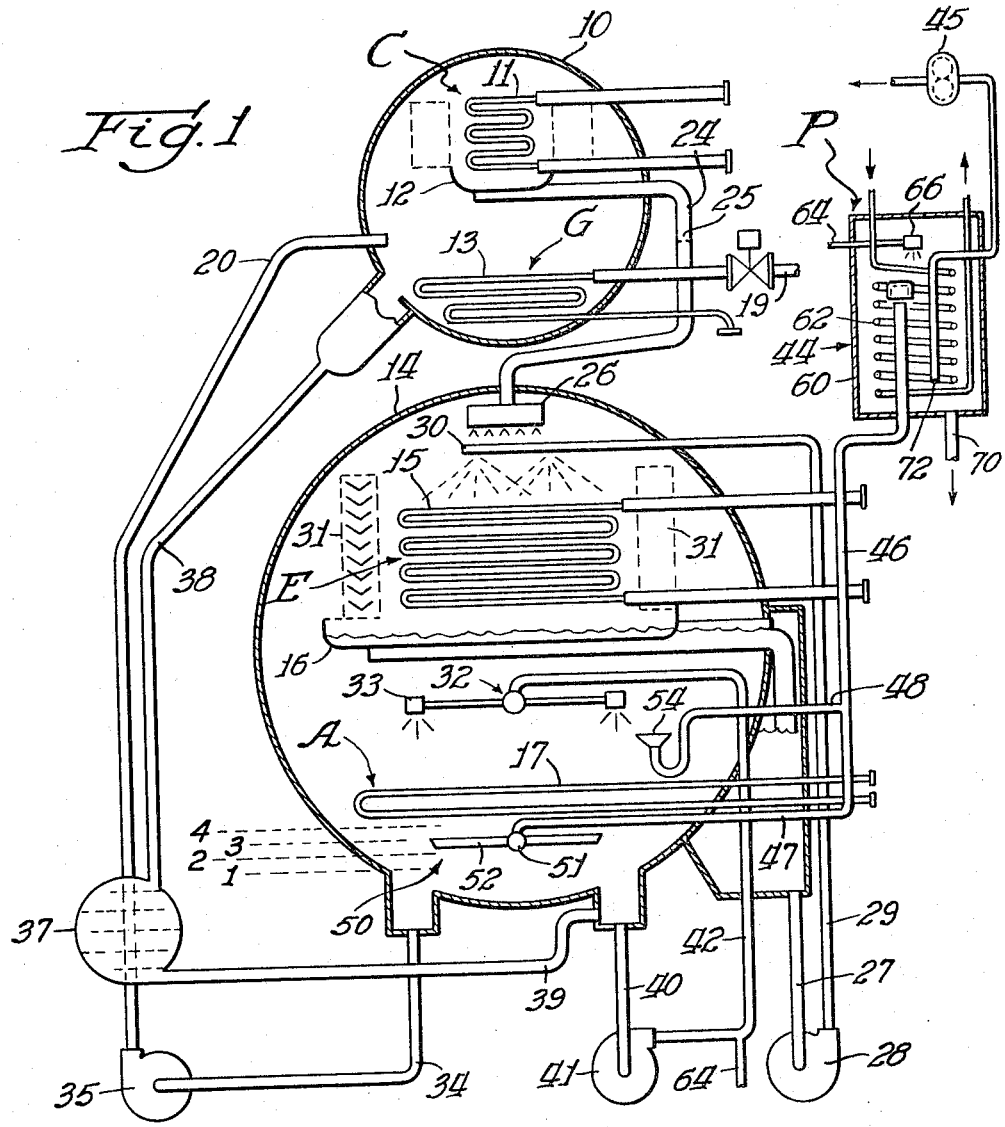
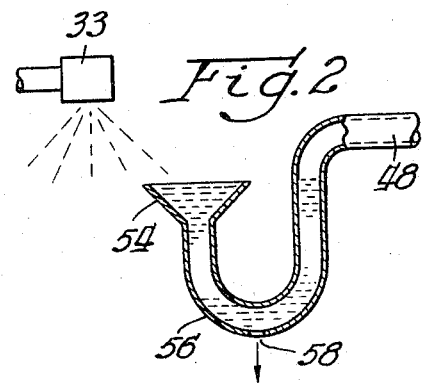
Inventors:
Neil E. Hopkins and
William L. Osborn
By: Thomas B. Hunter  Atty.

United States Patent Office 3,299,666
Patented Jan. 24, 1967

3,299,666
PURGE SYSTEM FOR ABSORPTION
REFRIGERATION APPARATUS
Neil E. Hopkins and William L. Osborn, York, Pa., assignors to Borg-Warner Corporation, Chicago, Ill., a corporation of Illinois
Filed Sept. 30, 1965, Ser. No. 491,679
3 Claims. (Cl. 62—475)

This invention relates to refrigeration apparatus, and more particularly to an improved purge system for removing non-condensible gases from an absorption refrigeration machine.

It is a principal object of the invention to provide a purge arrangement for more efficient removal of non-condensible gases under all conditions. Another object of the invention is to limit the take-off point for non-condensibles, while the system is in operation, to the zone where their concentration is relatively high, yet permit the gases to be withdrawn from a higher point when the absorption system is not operating. Still another object of the invention is to put into operation alternate points for exhausting non-condensible gases by means which avoids the use of mechanical devices, such as manually or automatically operated valves. Additional objects and advantages will be apparent from reading the following detailed description.

Various types of refrigeration systems, and particularly absorption refrigeration machines, require that non-condensible gases be removed therefrom to maintain their operating efficiency. This is because the presence of such gases, even in small quantities, will seriously reduce refrigeration capacity. For example in an absorption machine which utilizes water as the refrigerant and an aqueous solution of a hygroscopic salt such as lithium bromide (LiBr) as the absorbent, the absorber and evaporator operate under a high vacuum, viz., approximately $\frac{1}{100}$ atmosphere absolute. Consequently, small imperfections in the welds, piping connections and seals will allow some air to leak into the absorber, preventing proper absorption of refrigerant by blanketing the absorption solution and reducing heat transfer from the solution to the absorber tubes. Corrosion problems are also increased by the higher concentration of oxygen which reacts with the metal parts inside the machine.

In one conventional type of absorption system, the absorber and evaporator are housed within the same shell with the evaporator tube bundle being arranged at the upper portion thereof and the absorber tube bundle near the bottom. The water vapor sweeping down from the evaporator to the absorber tends to trap non-condensible gases in a zone underneath the absorber tube bundle and close to the surface of solution collected in the absorber. As a result, the purging system can be operated more efficiently if the take-off point for the suction pipe leading to the purge unit is located very close to the solution level in the absorber where the gases are more highly concentrated. Unfortunately, this is very difficult to achieve in practice because the level of solution in the absorber varies considerably, depending on certain conditions. When the absorption machine is operating at maximum capacity, the solution level is at a minimum; and when operating at minimum capacity, more of the refrigerant is absorbed in the solution and the level rises. Immediately after the system is shut down, the solution level (hereinafter referred to as the "short-term shut-down level") rises to a point higher than the level corresponding to minimum capacity operation because the pumps forwarding solution to the generator are shut down; and solution remaining in the supply headers and associated with the wetted absorber tube bundle drains down to the absorber shell. If the absorption machine is shut off for longer periods—approximately three weeks or longer—most of the refrigerant in the system tends to gravitate to the absorber which increases the solution level (hereinafter referred to as the "long-term shut-down level") to an even higher elevation.

From the foregoing, it should be clear that if the suction pipe is located at a point just above the highest *operating* level (minimum capacity), it will be submerged in solution shortly after shut-down, when the solution level rises. It has been common practice in the prior art to locate the point of take-off, i.e., the entrance end of the suction pipe, at an elevation high enough above the long-term shut-down level to permit the purge unit to operate and pump out non-condensibles prior to starting up the unit. There are, of course, times when the system is accidentally overcharged with solution and the suction pipe may be submerged even though it is located at a relatively high elevation. The higher up the purge line is located, the more room must be left between the absorber tube bundle and the bottom of the shell which necessarily increases the size of the shell and therefore results in additional costs. Consequently, systems are usually designed for the worst situation encountered in ordinary operation with the suction pipe located just above the long-term shut-down level.

In attempting to solve the aforementioned problems, the prior art has proposed the use of two purge lines, a main purge line in the lower part of the absorber and an auxiliary purge line located well above the normal point of take-off to permit the purging of the system when the lower suction pipe is submerged. With this type of system, however, the auxiliary purge line at the higher elevation will pass vapor containing only a very small proportion of non-condensible gases at the same time that the lower suction pipe is attempting to pull out a stream containing a relatively higher concentration of non-condensible gases. The type of arrangement, shown for example in United States Patent No. 2,520,027, has the disadvantage of rendering the purge system much less efficient, because only a small part of the total flow to the purge unit is taken off in the zone where the concentration of non-condensible gases is highest.

The present invention is directed to a unique and very effective purge system which avoids the problems inherent in the prior art by providing an auxiliary take-off which is normally closed while the system is in operation, but opens upon shut-down to permit purging of the shell through the auxiliary line when the lower suction pipe is completely submerged. In describing the system, reference will be made herein to a typical absorption refrigeration apparatus in which the generator and condenser are arranged in one shell, and the evaporator and absorber are arranged in another shell. It is obvious, however, that absorption refrigeration machines may take many other forms and the description should not necessarily be restricted to the particular arrangement described. Also, while the specification refers to an absorption refrigeration system of the type using lithium bromide as the absorbent solution, many other absorbent-refrigerant combinations are known; and it is not intended that the invention be limited to this particular system.

Referring now to the drawings, FIGURE 1 is a schematic illustration of an absorption refrigeration system incorporating the principles of the present invention; and FIGURE 2 is a detailed illustration, partly in cross-section, of the auxiliary purge line inlet.

The absorption refrigeration machine shown in FIGURE 1 is arranged in a twin shell configuration. The upper shell 10 includes a tube bundle 11 which cooperates with a pan 12 to provide a condenser C; and a second tube bundle 13 cooperates with the lower portion of shell 10 to provide a generator G. In the lower shell 14, tube bundle 15 is arranged above a pan 16, both of which cooperate to provide an evaporator E; and a fourth tube bundle 17, located underneath pan 16, is associated with the absorber A.

As is well understood by those skilled in the art, the operation of an absorption refrigeration machine depends on a refrigerant that boils at a temperature below that of a liquid being chilled and an absorbent possessing great affinity for the refrigerant. In the particular system to be described, the refrigerant is water and the absobent is an aqueous solution of a hygroscopic salt such as lithium bromide. While some absorption machines actually circulate the refrigerant directly to a load, the apparatus illustrated herein uses a secondary heat exchange medium (usually water) which is chilled in the evaporator by indirect contact with the refrigerant and then circulated to and from the load.

The generator G, the condenser C, the evaporator E and the absorber A are all connected to provide a closed circuit, continuous cycle refrigeration system. Relatively dilute (about 59% LiBr by weight) absorbent solution is circulated to the generator G through conduit 20 where it contacts tube bundle 13, to which a heating medium, such as steam or hot water, is supplied through line 19. Under the pressure conditions existing in the upper shell (about $1/10$ atmosphere) the solution boils, releasing water vapor and concentrating the solution. The water vapor boiled off in the generator flows upwardly to the condenser C where the vapor is brought into contact with tube bundle 11 through which cooling water (from a cooling water tower or the like) is circulated. The refrigerant condensing on the tube bundle is collected in pan 12 and forwarded through conduit 24, which contains an orifice 25 to maintain the proper pressure differential between the shells, to a refrigerant distributor 26 located above the evaporator. The refrigerant discharged from distributor 26, mostly liquid but containing some vapor, flows downwardly in contact with the evaporator tube bundle 15, commonly referred to as the chilled water coil, where it boils and abstracts heat from the water circulating therethrough, dropping the temperature from approximately 54° F. as it is normally returned from the load (at full capacity) to approximately 44° F. Unevaporated refrigerant collects in pan 16 and flows through one side of the lower shell and conduit 27 to the inlet side of refrigerant pump 28. From there, it is circulated back to the evaporator through conduit 29 and spray header 30 positioned above the chilled water coil 15. The water vapor formed in the evaporator by contact with the chilled water coil passes through eliminators 31, employed to reduce the amount of liquid refrigerant carried into the absorber, and sweeps downwardly into the absorber section A where it is absorbed in the solution, the heat of solution being removed by contact with the absorber tube bundle 17.

As the water vapor is dissolved in absorbent solution, the solution naturally becomes more dilute and is withdrawn through conduit 34 to the inlet side of generator pump 35. The relatively cool, dilute solution to be forwarded to the generator passes through a solution heat exchanger 37 where it is brought into indirect heat exchange relation with the hot, concentrated solution passing from the generator through conduit 38. The relatively concentrated solution is cooled through an appreciable range, withdrawn from solution heat exchanger 37 through conduit 39, and introduced into a stream of relatively dilute solution (at a point remote from the inlet portion of dilute solution line 34) where it mixes with said dilute solution to form an intermediate (62–63% LiBr) strength solution. This is taken off through line 40 and pumped by solution pump 41 via line 42 to the absorber spray header 32. This intermediate strength solution of lithium bromide is continuously distributed through nozzles 33 over the absorber tube bundle 17, which is also supplied with cooling water and usually connected in series with the condenser coil.

As pointed out in the preliminary remarks, the present invention is more particularly directed to a purge system which limits the point at which the non-condensible gases are withdrawn to a zone which is below the short-term shut-down level of solution, but will still permit purging of the shell when the main purge line is submerged. The various levels of solution occurring within the absorber are indicated by solution level lines in FIGURE 1. The level indicated at 1 corresponds to maximum capacity operation; level 2 represents minimum capacity operation; level 3 represents the short-term shut-down level condition; and level 4 corresponds to long-term shut-down.

The purge unit, indicated generally at P, comprises an auxiliary absorber 44, used to concentrate the non-condensible gases which are withdrawn from the shell, a vacuum pump 45 or other suitable vacuum source connected to the purge gas concentrator, and conduits 46, 47, 48 connecting the purge gas concentrator and vacuum pump to the absorber A.

The main purge line 47 terminates in a suction pipe network 50 which comprises a longitudinal header 51 extending along the lower portion of the absorber and a plurality of suction pipes 52 extending laterally outwardly, each of which has its entrance end positioned just above level 2, but below level 3.

The auxiliary purge line which is adapted to withdraw non-condensibles from a zone above the long-term shut-down level 4, comprises a conduit 48 terminating in a funnel-shaped or enlarged opening 54. Both the main suction pipe network and the auxiliary purge pipe are connected to the purge gas concentrator and vacuum source by means of a conduit 46.

The inlet end 54 of conduit 48 is located under one or more of the absorber spray nozzles 33 associated with the solution circulation system so that it is continuously supplied with solution at any time that the absorber pump is in operation. It is desirable to locate the open end of the auxiliary suction pipe under more than one nozzle so that if some of the nozzle openings should be clogged, the suction pipe will still receive solution. As shown best in FIGURE 2, the auxiliary suction pipe 48 is formed with a U-shaped trap 56, the lower portion of which is provided with an aperture 58 to permit solution to drain continuously therefrom.

While a vacuum pump could be used alone for purging the system, it is more efficient to provide additional means for concentrating the non-condensibles before they reach the vacuum pump. The purge gas concentrator 44 comprises a secondary absorber into which a stream of intermediate strength solution is delivered to absorb water vapor carried out from the absorber in the purge gas stream. Since the noncondensible gases comprise, even at their highest concentrations, only a small portion of the total flow exhaust during purging, the vacuum pump can operate more efficiently if the condensibles are removed upstream from the point at which the gases are introduced into the suction side of the vacuum pump.

While various forms of such purge gas concentrators are known, the type illustrated comprises a tank or chamber 60 into which the vapor from both the main suction pipe and the auxiliary suction pipe are introduced through line 46. Cooling water to absorb the heat generated by dissolution of the water vapor in the absorbent is circulated through a coil 62, the inlet and outlet of which may be connected into the cooling water circuit, supplying the absorber and condenser. Concentrated solution is supplied through line 64 connected to the discharge side of solution pump 41, and delivered to a spray nozzle 66 where it is sprayed over the coil 62. The relatively dilute solution from chamber 60 is withdrawn from the lower portion of the housing and returned to the absorber through line 70. The suction side of the vacuum pump 45 is connected to a conduit 72 which extends into the chamber in such a way that gases may be freely withdrawn into the entrance end thereof without taking out too much unabsorbed water vapor.

Operation

While the absorption machine is operating, the auxiliary purge line continuously receives solution from the absorber spray header and the U-shaped trap 56 is kept filled with solution. Even though the solution is draining from the aperture 58, the volume of solution supplied by the spray header is greater than that which will pass out through the aperture and any excess merely spills over the open end of the funnel shaped entrance 54. Since the vacuum pump cannot draw any significant head on the solution in the trap (due to the fact that pressure acting on the solution is only about $1/100$ of an atmosphere), the height of the solution in the leg nearest to the purge gas concentrator will only be slightly higher than the solution in the other leg.

While the absorption machine is operating, the solution level in the absorber will vary between level 1 and level 2, depending upon the capacity at which the machine is operating. Accordingly, if it is desired to purge the unit, all of the gas withdrawn from the shell will be educted from the main suction pipe above the solution level, the auxiliary suction pipe being blocked by the slug of liquid in the trap.

When the unit is shut down and all pumps are turned off, the auxiliary purge line 48 no longer receives solution and all of the liquid in the trap will drain out through aperture 58. Shortly after shut-down, the main suction pipe will be submerged because the solution level will have risen to level 3. It it is desired to purge the system prior to start-up, it is then possible to pump out the shell through the auxiliary suction pipe because the entrance end thereof is no longer blocked by solution in the trap.

While this invention has been described in connection with a certain specific embodiment thereof, it is to be understood that this is by way of illustration and not by way of limitation; and the scope of this invention is defined solely by the appended claims which should be construed as broadly as the prior art will permit.

What is claimed is:

1. A purge system for exhausting non-condensible gases from the absorber in an absorption refrigeration machine, said purge system comprising a vacuum source operative to induce non-condensible gases from said absorber; a first conduit connecting said vacuum source to a zone above the minimum capacity solution level in said absorber, but below the short-term shut-down solution level; second conduit means connecting said vacuum source to a zone in said absorber above the long-term shut-down solution level; and means for blocking flow of non-condensible gases through said second conduit means only during periods when said absorption refrigeration machine is in operation, said means including a liquid trap in said second conduit means, said trap having an aperture formed therein to drain liquid from said trap to said absorber at a predetermined rate, and means for supplying liquid to said second conduit means and said trap, while said absorption machine is operating, at a rate exceeding the drainage rate from said trap.

2. A purge system as defined in claim 1 wherein said second conduit is arranged to receive absorbent solution circulating in said absorber.

3. A purging arrangement adapted to be connected to an absorption refrigeration system to purge non-condensible gases from the absorber of said system comprising a vacuum source, a purge gas concentrator connected to said vacuum source; first conduit means connecting said purge gas concentrator to said absorption refrigeration system to evacuate non-condensible gases from the zone having the highest concentration of said non-condensible gases; and second conduit means connecting said purge gas concentrator to a zone substantially higher than said first zone; and means for automatically preventing flow through said second conduit while said absorption refrigeration system is in operation, but permitting flow therethrough when the operation of said system is discontinued, said last named means including a liquid trap, means for supplying liquid to said trap only during periods when said absorption refrigeration system is operating, and means in the lower portion of said trap for draining liquid from said trap into said absorber at a rate slower than the rate at which liquid is supplied thereto.

References Cited by the Examiner
UNITED STATES PATENTS

| 2,344,245 | 3/1944 | Grossman | 62—475 X |
| 2,940,273 | 6/1960 | Leonard | 62—475 X |
| 3,014,349 | 12/1961 | Leonard | 62—85 |

References Cited by the Applicant
UNITED STATES PATENTS

| 2,733,575 | 2/1956 | Leonard. |
| 2,961,852 | 11/1960 | Burton. |
| 3,174,296 | 3/1965 | Aronson et al. |

ROBERT A. O'LEARY, *Primary Examiner.*

W. E. WAYNER, *Assistant Examiner.*